(12) United States Patent
Dillon et al.

(10) Patent No.: US 6,484,391 B1
(45) Date of Patent: Nov. 26, 2002

(54) FIXTURE AND WORKTABLE TO PRESS A BUSHING IN A CARRIER

(75) Inventors: Roderick Brent Dillon, Fort Wayne, IN (US); Jeff D. Buchanan, Auburn, IN (US); Karl J. Goede, Ossian, IN (US); Samuel J. Wirts, Roanoke, IN (US); Ronald Lee Zimmerman, Leo, IN (US); Michael L. Gamble, Huntington, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 2 days.

(21) Appl. No.: 09/629,181

(22) Filed: Jul. 31, 2000

(51) Int. Cl.[7] .......................... B25B 27/02; B25B 27/06
(52) U.S. Cl. ..................... 29/790; 29/898.07; 29/281.3; 29/718; 269/55
(58) Field of Search ................................ 29/525, 281.1, 29/281.3, 281.4, 281.5, 281.6, 790, 468, 898.07, 898.08, 714, 718; 269/55, 56, 57; 100/215, 229 A, 231

(56) References Cited

U.S. PATENT DOCUMENTS 2,602,508 A * 7/1952 Patrick
2,604,692 A * 7/1952 Broden
2,871,768 A * 2/1959 Froberg, Jr.
3,211,085 A * 10/1965 Zeppetello
3,393,439 A * 7/1968 Shriver
5,115,549 A * 5/1992 Maruyama
5,692,437 A * 12/1997 Tabain

FOREIGN PATENT DOCUMENTS

JP 08-019922 * 1/1996
JP 08-155762 * 6/1996

* cited by examiner

Primary Examiner—I. Cuda-Rosenbaum
Assistant Examiner—Eric Compton
(74) Attorney, Agent, or Firm—Liniak, Berenato & White

(57) ABSTRACT

A bushing installation and removal assembly includes mounting table fitted with a vice fixture, a press/ram assembly having a controlled hydraulic press whereby a separate hydraulic repositioning system disposes the work piece into the press/ram assembly in a controlled manner. The worktable, fixtures and press/ram assembly are designed to receive and securely position the housing assembly (work piece) onto a controlled substrate. The substrate is then designed to reposition the housing assembly (work piece) proximate to the press ram, which suitably presses the bushing member onto the housing assembly (work piece). The substrate is then retracted to its original position where the housing assembly (work piece) is removed for further processing.

8 Claims, 4 Drawing Sheets

FIXTURE AND WORKTABLE TO PRESS A BUSHING IN A CARRIER

BACKGROUND OF THE INVENTION

1. Field of the Invention

The invention relates to a tool for installing and removing bushings located on an ear disposed on a metallic housing member and, in particular, to a tool for installing onto and removing bushings from a differential carrier.

2. Description of Related Art

Bushings are applied to a variety of housing and devices that are quite heavy and difficult to transport. The installation and removal of bushing from these large housings and mounting structures poses a difficult task for mechanics and engineers alike. Conventionally, these bushings are hammered or pressed into place while the housing or mounting structure is manually supported or otherwise held in place.

Great difficulties arise in the conventional bushing installation and removal process due to the weight and awkward configuration of the mounting structure. Moreover, the forces necessary to press large bushing members into a suitable aperture require a stable support stand and an accurately aligned pressing tool. Particularly in the environment of automotive components and, in particular, differential carriers, no suitable support table and pressing tools exists that meets the current structural and functional requirements of current driveline assembly lines. Moreover, existing installation tools are inefficient and arduous.

The need therefore exists for a tool for installing and removing bushings located on an aperture disposed on a metallic housing member and, in particular, to a tool for installing and removing bushings for a differential carrier.

SUMMARY OF THE INVENTION

The invention provides a unique structure and method for installing a bushing onto a housing or mounting assembly.

The benefits and advantages of the present invention are achieved by a mounting table fitted with a vice fixture and a press/ram assembly having a controlled hydraulic press whereby a separate hydraulic repositioning system disposes the work piece into the press/ram assembly in a controlled manner. The worktable, fixtures and press/ram assembly are designed to receive and securely position the housing assembly (work piece) onto a controlled substrate. The substrate is then designed to automatically position the housing assembly (work piece) proximate to the press ram, which suitably presses the bushing member onto the housing assembly (work piece). The substrate is then retracted to its original position where the housing assembly (work piece) is removed for further processing.

In operation, the operator loads the work piece onto the worktable, and the operator properly clamps the work piece with the vice assembly disposed on the worktable. A cylinder-operated piston then repositions the worktable and associated work piece into a working position (i.e., locating the work piece within a ram press). The operator then loads the bushing into the work piece, and a support block is positioned under the bushing-receiving part of the work piece. The ram presses the bushing into the bushing-receiving portion of the work piece. Next, ram is retracted and all cylinders for the worktable are retracted thus removing the work piece from the ram press. The work piece is then unclamped from the worktable and the part is unloaded.

BRIEF DESCRIPTION OF THE INVENTION

Further details and advantages of the invention will be apparent from the description provided below in conjunction with the appended drawings.

DETAILED DESCRIPTION OF PREFERRED EMBODIMENT

Figure 1:
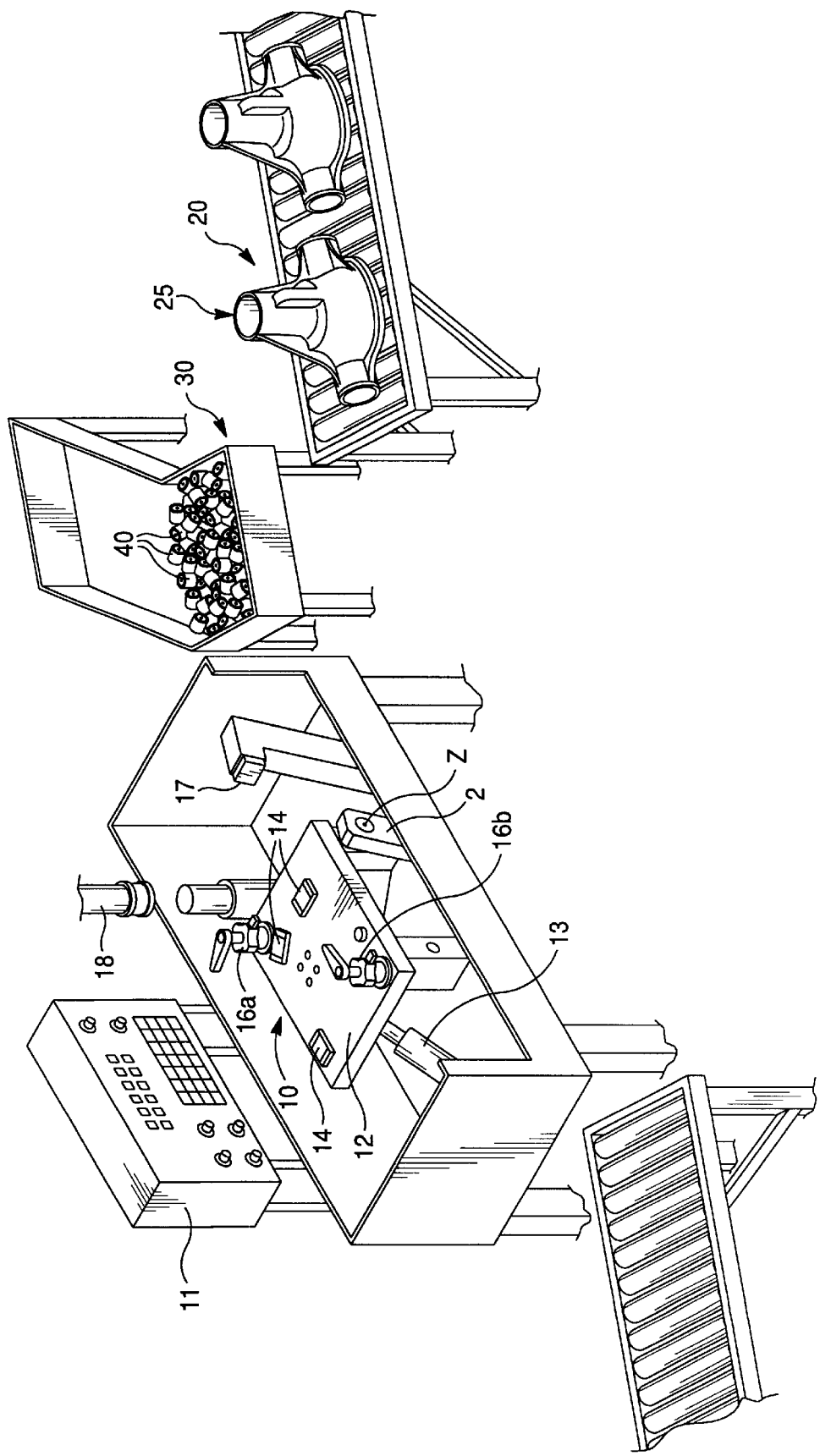
FIG. 1 is a perspective view of the worktable and bushing fixture assembly of the present invention.

With reference to FIGS. 1–4, the present invention will now be described in more detail, whereby a work table 10 is disposed adjacent a conveyor system 20 for a series of work pieces 25 and a bin 30 filled with bushing members 40.

The work table 10 is arranged as a planar substrate 12 having a series of mounting plates 14 as well as vice components 16a, 16b disposed adjacent a ram/press assembly 18. The work table 10 is pivotally mounted by pivot arms 2 (one shown in FIG. 1), and a hydraulic drive piston 13 is arranged to move the work table 10 from the mounting position (shown in FIG. 1) to a press position (see FIG. 2). The hydraulic drive piston 13 pivots the worktable about the pivot axis 'z—z' created at the junction of the pivot arms 2 and the worktable 10 to a point where the worktable 10 rests against the stopper 17. The location of the stopper 17 helps to define the press position whereby the work piece 25 is suspended in an upright position to align a bushing-receiving aperture (see FIGS. 3 and 4) with the ram/press assembly.

With the layout of the worktable 10, the work piece 25 is consistently and reliably disposed in a proper press position to receive a bushing 40 via the ram/press assembly 18. In other words, the worktable 10 is designed to insure proper alignment after the worktable 10 and work piece 25 are pivoted to the press position without further adjustment or re-alignment by the operator. In the mounting position shown in FIG. 1, a flange portion of the work piece 25 is easily positioned on the mounting plates 14 and locked into place via the vice components 16a, 16b. More specifically, the vice components 16a, 16b have engagement legs which pivot away from the mounting plates 14 (i.e., out of the path of the work piece 25 being placed on the work table 10). Once the work piece 25 is properly positioned on the mounting plates 14, the engagement legs are positioned over the flange portion of the work piece 25 and the vice components are tightened to secure the work piece 25 in place.

A hydraulic piston system causes the worktable 10 to pivot about its pivot axis 'z—z' from the mounting position to the press position. A separate hydraulic piston system causes the ram/press to press the bushing 40 into the associated bushing housing.

A control center 11 is also provided to control and observe the operation and function of various components of the invention including, but not limited to, the hydraulic piston 13 and the ram/press 18.

Figure 2:
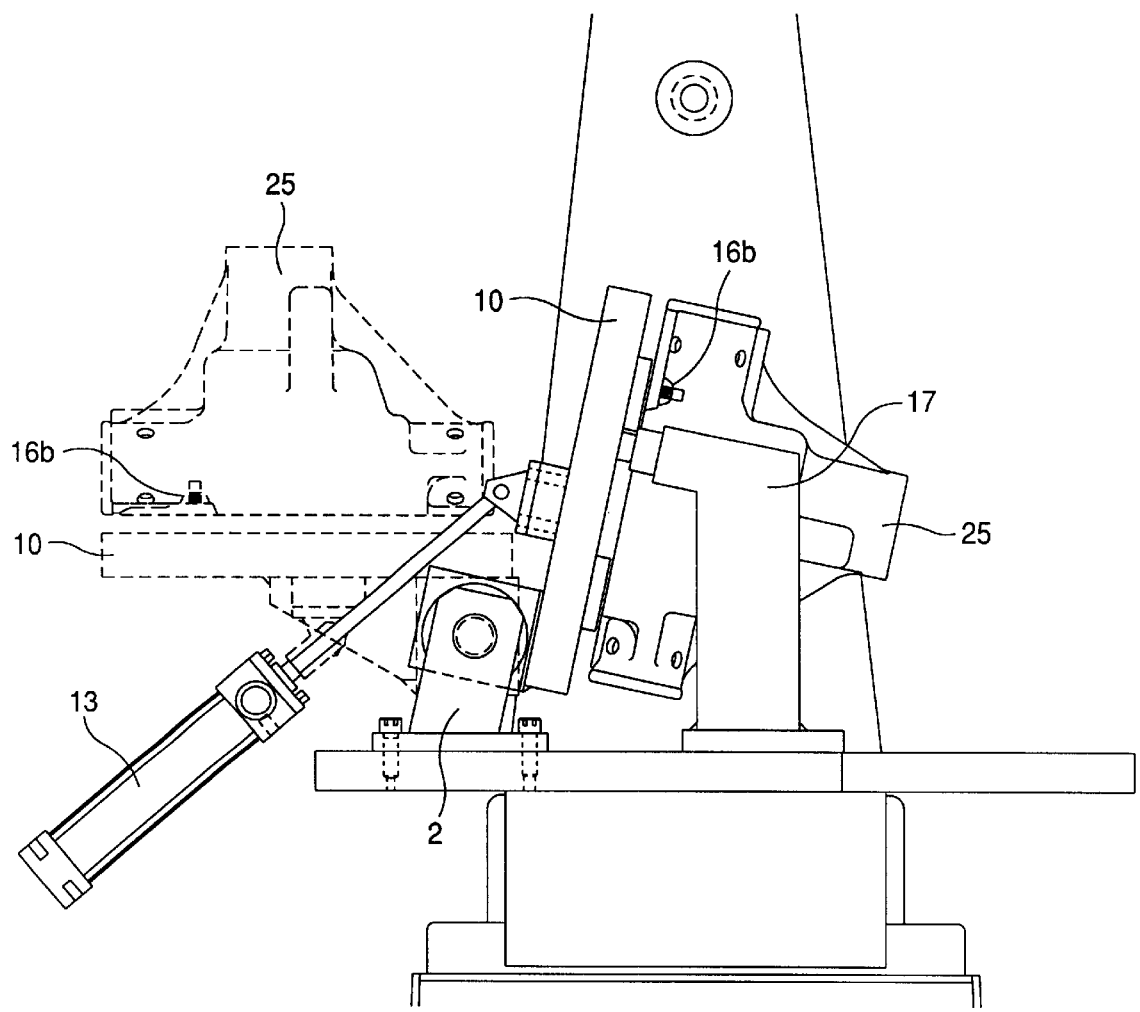
FIG. 2 is a front view showing the worktable with a work piece (differential carrier) mounted thereon, whereby the worktable is shown in a first mounting position and a second pressing position.
Figure 3:
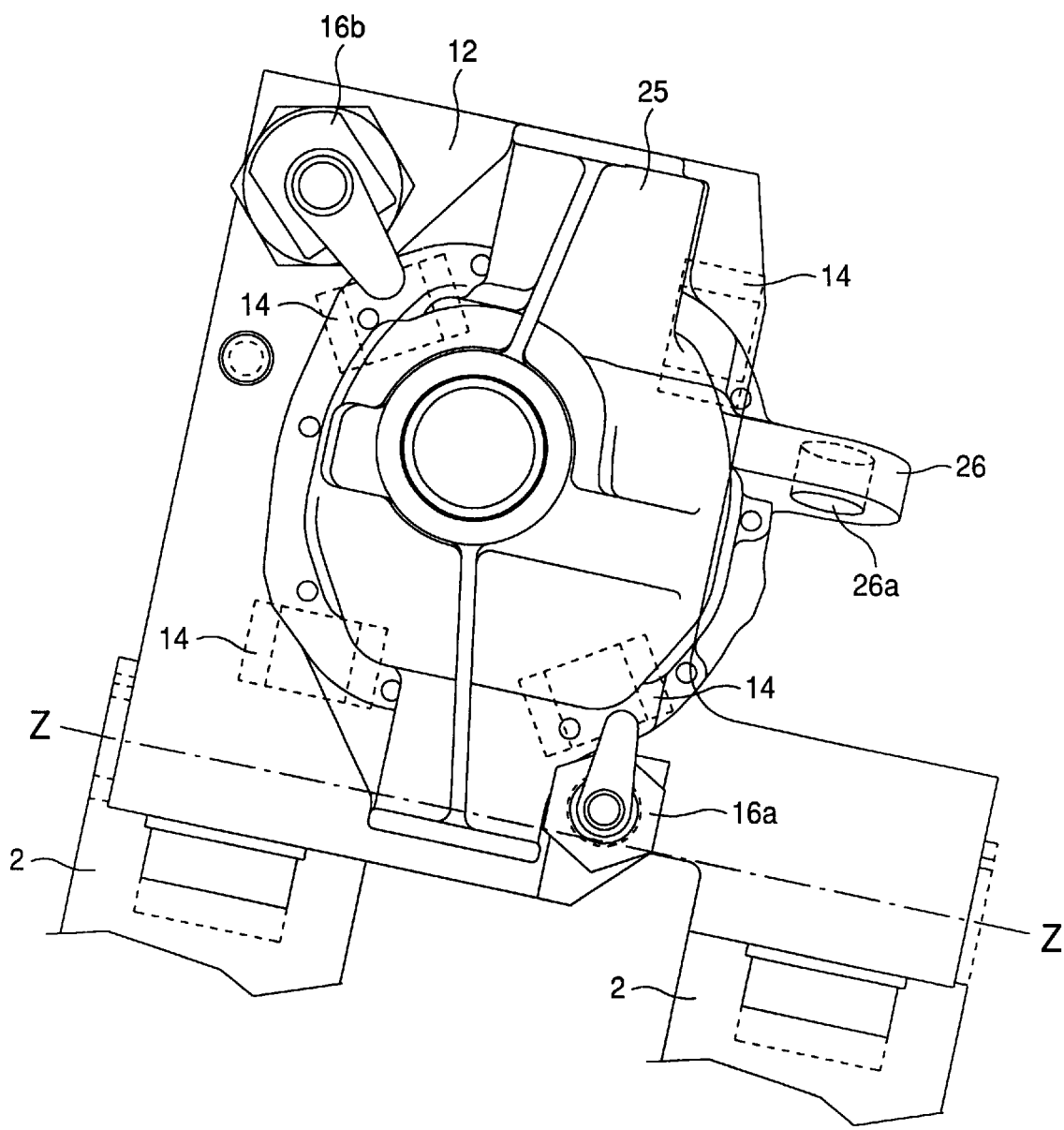
FIG. 3 is a top view of the work table showing a differential carrier mounted thereon.

FIG. 2 shows the worktable 10 in its press position (in solid lines) with the mounting position of the worktable 10 shown in dashed lines. In the press position, the substrate 12 contacts the stopper 17 at a position where the substrate 12 is slightly past the vertical (90°) orientation because the bushing-receiving portion of the work piece 25 is slightly skewed with respect to the vertical orientation (see FIG. 3). More specifically, FIG. 3 is a top view of the worktable 10 and shows the work piece 25 having an ear 26 defining the bushing-receiving portion with the bushing being pressed into the aperture 26a of the ear 26. Thus, the worktable 10 and the stopper 17 are located to properly orient the bushing-receiving portion 26 within the ram/press assembly as described in more detail below.

FIG. 3 also shows the mounting plates 14 and vice components 16a, 16b specifically configured on the substrate 10 to provide an adequate mounting structure for the work piece 25.

Figure 4:
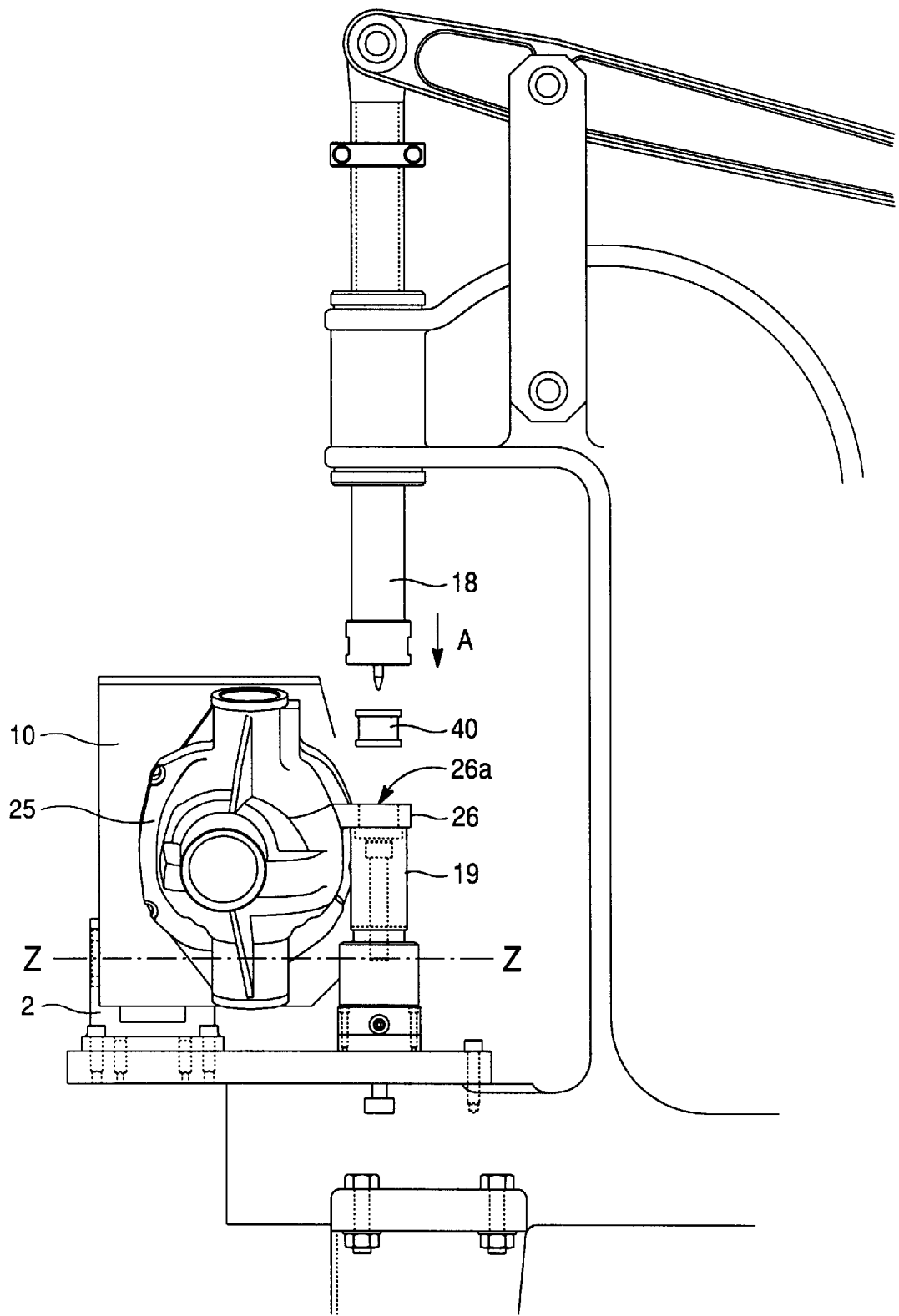
FIG. 4 is a view of the work piece in the press position in conjunction with the ram/press.

FIG. 4 illustrates the work piece 25 mounted on the worktable 10 with the vice components omitted for simplicity. Also illustrated is the ear 26 disposed in the ram/press assembly 18. Specifically, the ear 26 is disposed on the support block 19 in a manner to lie flush on the support block 19 thereby aligning the aperture 26a of the ear 26 with the vertical axis of travel 'A' for the ram/press 18 in order to properly and efficiently press the bushing 40 into the ear 26.

Once the bushing is properly pressed into the ear 26, the ram/press 18 is withdrawn and the worktable 10 is returned to its mounting position shown in FIG. 1. Thereafter, the work piece 25 is removed from the worktable 10 and the worktable is ready for another work piece from the conveyor 20. The finished work piece 25 is then placed on a downstream conveyor for further processing. it is also envisioned that the installation apparatus of this invention also includes a fine-tune adjustment mechanism for adjusting the relative position of the work piece relative to the ram/press to thereby insure that the work piece is accurately position relative to the press with the work piece is disposed in the press position. The fine-tune adjustment mechanism accounts for any misalignment of the work piece relative to the work table and/or for variations in the work piece configuration by permitting adjustment in one or more of the x-axis, y-axis and/or z-axis directions.

From the foregoing description and associated drawings, it will be understood that the present invention provides an efficient and accurate assembly for installing and removing bushings from a work piece or housing structure. The controlled process provided by the present invention eliminates the error and misalignment associated with the conventional bushing worktables.

The installation process is conducted as follows: the operator loads the work piece onto the worktable, and the operator properly clamps the work piece with the vice assembly disposed on the worktable. A hydraulically operated piston/cylinder arrangement then repositions the worktable and associated work piece into a working position (i.e., properly locating the work piece within a ram press). The operator then preliminarily loads the bushing into the work piece, and a support block is positioned under the bushing-receiving part of the work piece. The ram presses the bushing into the bushing-receiving portion of the work piece. Next, ram is retracted and all cylinders for the worktable are retracted thus removing the work piece from the ram press. The work piece is then unclamped from the worktable and the part is unloaded.

For the bushing removal process, the foregoing steps are repeated except that the ram/press operates to punch the defective or improper bushing from the work piece.

The foregoing process eliminates the manual procedure typically used to install bushings and improves the accuracy and efficiency of bushing installation and removal. While the foregoing invention has been shown with a differential carrier as the work piece, the instant invention is equally applicable to any work piece or component requiring installation or removal of a bushing member; particularly where the work piece is heavy and difficult to manipulate by hand.

While the present invention has been shown and described with respect to a preferred embodiment, it will be understood by those of skill in the art that various changes in form and detail may be made therein without departing from the spirit and scope of the instant invention.

What is claimed is:

1. An installation and removal assembly for positioning a bushing with respect to a work piece, said assembly comprising:

a movable worktable including a base substrate and a mounting structure for securing said work piece to said base substrate;

a press device disposed adjacent said movable worktable for pressing a bushing member into and/or out of an aperture provided on said work piece; and an automatic positioning mechanism for orienting said work piece at a press position substantially within a working press area of said press device where said bushing member is pressed into said work piece, wherein said movable worktable is automatically moved from a mounting position where said work piece is mounted onto said substrate to said press position within said working press area of said press device, and wherein said worktable pivots about a pivot axis from said mounting position to said press position.

2. The assembly of claim 1, further comprising a stopper for engaging said work table when said worktable has pivoted to said press position.

3. The assembly of claim 1 wherein said mounting structure comprises a vice for securely fixing said work piece onto said substrate.

4. The assembly of claim 3, wherein said mounting structure further comprises a series of mounting plates arranged in a predetermined configuration on said substrate to properly position said work piece on said worktable.

5. The assembly of claim 1, wherein said work piece is a differential carrier having an ear portion formed with an aperture for receiving said bushing member, said mounting structure grips a flange formed on said differential carrier to secure said differential carrier on said work table.

6. The assembly of claim 5, further comprising a control system for actuating at least one of said automatic positioning mechanism to adjust a position of said worktable and said press device.

7. The assembly of claim 1, further comprising a fine tune adjustment system for providing a fine-tune adjustment of a position of said work piece relative to said press device to insure accurate installation of said bushing member.

8. An installation and removal assembly for positioning a bushing with respect to a work piece, said assembly comprising:

a movable worktable including a base substrate and a mounting structure for securing said work piece to said base substrate;

a press device disposed adjacent said movable worktable for pressing a bushing member into and/or out of an aperture provided on said work piece; and an automatic positioning mechanism for orienting said work piece at a press position substantially within a working press area of said press device where said bushing member is pressed into said work piece, wherein said movable worktable is automatically moved from a mounting position where said work piece is mounted onto said substrate to said press position within said working press area of said press device, wherein said work piece is a differential carrier having an ear portion formed with said aperture for receiving said bushing member, said mounting structure grips a flange formed on said differential carrier to secure said differential carrier on said worktable, and wherein said substrate pivots through an angle greater than 90 degrees to orient said ear portion within said working press area for said press device.

* * * * *